(12) United States Patent
Brucker

(10) Patent No.: US 12,373,354 B2
(45) Date of Patent: Jul. 29, 2025

(54) ACCESS STATE FOR PAGE TABLE ENTRIES

(71) Applicant: Arm Limited, Cambridge (GB)

(72) Inventor: Jean-Philippe Brucker, Cambridge (GB)

(73) Assignee: Arm Limited, Cambridge (GB)

(*) Notice: Subject to any disclaimer, the term of this patent is extended or adjusted under 35 U.S.C. 154(b) by 51 days.

(21) Appl. No.: 18/536,394

(22) Filed: Dec. 12, 2023

(65) Prior Publication Data

US 2025/0190363 A1 Jun. 12, 2025

(51) Int. Cl.
*G06F 12/1045* (2016.01)
*G06F 12/1009* (2016.01)
*G06F 12/1027* (2016.01)

(52) U.S. Cl.
CPC ...... *G06F 12/1063* (2013.01); *G06F 12/1009* (2013.01); *G06F 12/1027* (2013.01)

(58) Field of Classification Search
None
See application file for complete search history.

(56) References Cited

U.S. PATENT DOCUMENTS

| | | | | |
|---|---|---|---|---|
| 11,194,580 B2* | 12/2021 | Gschwind | ............ | G06F 12/1027 |
| 2012/0265963 A1* | 10/2012 | Agesen | ............... | G06F 12/1027 |
| | | | | 711/207 |
| 2013/0024597 A1* | 1/2013 | Loh | ..................... | G06F 12/1009 |
| | | | | 711/E12.024 |
| 2017/0097898 A1* | 4/2017 | Durham | ............. | G06F 12/1408 |
| 2022/0179799 A1* | 6/2022 | Erickson | ............. | G06F 12/0882 |
| 2022/0414016 A1* | 12/2022 | Smith | ................ | G06F 12/0891 |

* cited by examiner

*Primary Examiner* — Yaima Rigol
(74) *Attorney, Agent, or Firm* — NIXON & VANDERHYE P.C.

(57) ABSTRACT

An apparatus for address translation is provided in order to translate virtual addresses used by devices in a data processing system into physical addresses for accessing memory. In accordance with the techniques disclosed herein, state tracking circuitry is provided to maintain the state of a page table entry that specifies such address translations. The state can be used to assess whether or not the address translation entry is worth storing in an address translation cache provided for faster access of previously used address translations. Accordingly, the techniques disclosed herein allow for more efficient use of the limited capacity available in the address translation cache as well as additional uses of a page table entry's state.

20 Claims, 10 Drawing Sheets

| access state | usage state | interpretation of states |
|---|---|---|
| 0 0 | 0 | initial non-accessed state |
| 0 0 | 1 | non-accessed / access in progress |
| 0 1 | 0 | first-accessed / available |
| 0 1 | 1 | first-accessed / access in progress |
| 1 0 | 0 | second-accessed / available |
| 1 0 | 1 | second-accessed / access in progress |
| 1 1 | 0 | multi-accessed / available |
| 1 1 | 1 | multi-accessed / cached |

FIG. 5

ACCESS STATE FOR PAGE TABLE ENTRIES

TECHNICAL FIELD

The present disclosure relates to data processing. In particular, the present disclosure relates to management of caching page table entries.

DESCRIPTION

A data processing apparatus may initiate an access to a memory with reference to an address space that is different from the physical address space used in the memory itself. For example, a data processing apparatus may refer to a virtual address space, whereas an external device may refer to a virtual address space and/or an address space dedicated to that device. The addresses in these virtual address spaces must be translated into the physical address space in order to access the memory.

To perform the translation function, a data processing apparatus may include a memory management unit (MMU) to perform address translation using page tables stored in memory. Recent translations may be stored in an address translation cache, such as a translation lookaside buffer (TLB), so that translations for frequently accessed addresses can be obtained more quickly.

SUMMARY

In one example embodiment described herein there is provided an apparatus comprising: state tracking circuitry configured to maintain an access state of a page table entry specifying an address translation, wherein the state tracking circuitry is configured to update the access state of the page table entry from a non-accessed state to a first-accessed state in response to an access to the page table entry; and control circuitry configured to control caching of the address translation in an address translation cache, wherein in response to the access state of the page table entry being the non-accessed state or the first-accessed state, the control circuitry is configured to suppress caching of the address translation in the address translation cache.

In another example embodiment described herein there is provided a system comprising: an apparatus comprising: state tracking circuitry configured to maintain an access state of a page table entry specifying an address translation, wherein the state tracking circuitry is configured to update the access state of the page table entry from a non-accessed state to a first-accessed state in response to an access to the page table entry; and control circuitry configured to control caching of the address translation in an address translation cache, wherein in response to the access state of the page table entry being the non-accessed state or the first-accessed state, the control circuitry is configured to suppress caching of the address translation in the address translation cache; at least one system component; and a board, wherein the at least one packaged chip and the at least one system component are assembled on the board.

In another example embodiment described herein there is provided a chip-containing product comprising the system described above, assembled on a further board with at least one other product component.

In another example embodiment described herein there is provided a method comprising: maintaining an access state of a page table entry specifying an address translation; updating the access state of the page table entry from a non-accessed state to a first-accessed state in response to an access to the page table entry; and controlling caching of the address translation in an address translation cache, wherein in response to the access state of the page table entry being the non-accessed state or the first-accessed state, suppressing caching of the address translation in the address translation cache.

In another example embodiment described herein there is provided a non-transitory computer-readable medium to store computer-readable code for fabrication of an apparatus comprising: state tracking circuitry configured to maintain an access state of a page table entry specifying an address translation, wherein the state tracking circuitry is configured to update the access state of the page table entry from a non-accessed state to a first-accessed state in response to an access to the page table entry; and control circuitry configured to control caching of the address translation in an address translation cache, wherein in response to the access state of the page table entry being the non-accessed state or the first-accessed state, the control circuitry is configured to suppress caching of the address translation in the address translation cache.

BRIEF DESCRIPTION OF THE DRAWINGS

The present invention will be described further, by way of example only, with reference to embodiments thereof as illustrated in the accompanying drawings, in which:

FIG. 5 shows a table of access states and usage states according to some example embodiments;

DESCRIPTION OF EXAMPLE EMBODIMENTS

Figure 1:
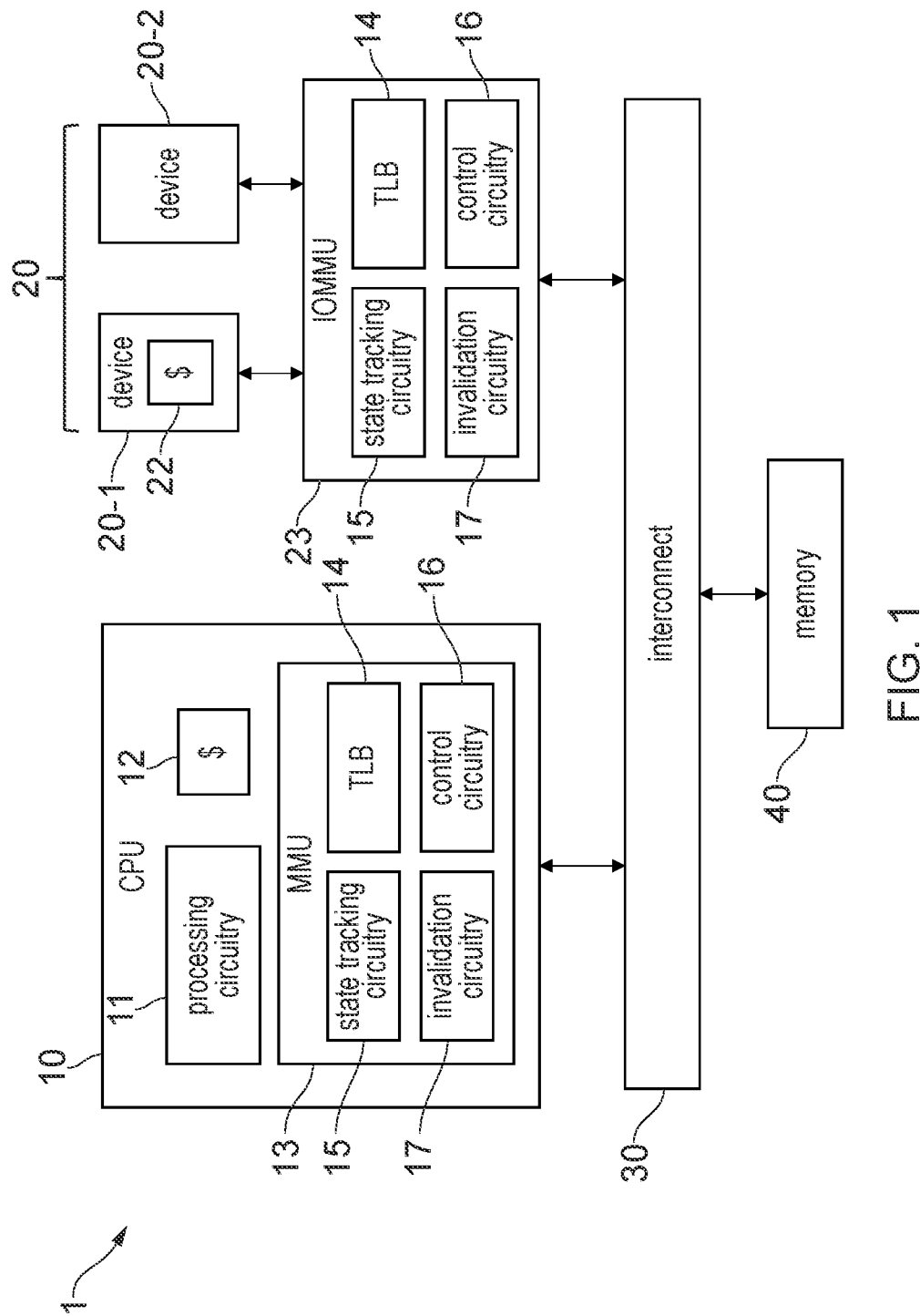
FIG. 1 schematically illustrates a data processing system comprising an apparatus according to some example embodiments.

Before discussing the embodiments with reference to the accompanying figures, the following description of embodiments is provided.

In accordance with one example configuration there is provided an apparatus comprising: state tracking circuitry configured to maintain an access state of a page table entry specifying an address translation, wherein the state tracking circuitry is configured to update the access state of the page table entry from a non-accessed state to a first-accessed state in response to an access to the page table entry; and control circuitry configured to control caching of the address translation in an address translation cache, wherein in response to the access state of the page table entry being the non-accessed state or the first-accessed state, the control circuitry is configured to suppress caching of the address translation in the address translation cache.

It is desired that a data processing apparatus that makes use of an address translation cache to store recently translated address translations uses the available capacity in the cache as efficiently as possible. In particular, it is preferable for as many of the address translations as possible to be frequently and repeatedly used by incoming memory requests so that performing a page table walk (and incurring the associated latency) is less often necessary.

The present techniques allow for an assessment of how useful a particular address translation specified by a page table entry is expected to be. For example, if the page table entry is only accessed once or accessed only infrequently, then the expected performance advantage of caching the address translation to the address translation cache may not be achieved. In some cases, caching such an address translation could reduce performance due to causing a potentially more useful existing address translation to be evicted from the address translation cache.

The usefulness of a particular page table entry is indicated by the access state maintained by the state tracking circuitry according to the present techniques. When a page table entry is created, for example by a supervisory software process such as an operating system or hypervisor, the access state is initialised as a non-accessed state, which is interpreted to indicate that the page table entry has not been accessed as part of a page table walk. The state tracking circuitry may monitor accesses to page table entries and update the access state from non-accessed to a first-accessed state, which is interpreted to indicate that the page table entry has been accessed once. Accordingly, the access state is capable of indicating whether a page table entry has been accessed zero, one, or more times.

Control circuitry is provided to control the caching of address translations in an address translation cache. The control circuitry is configured to be responsive to the access state of a page table entry when determining whether to cache the corresponding address translation in the address translation cache. According to the present techniques, the control circuitry suppresses caching of the address translation in response to the page table entry being in the non-accessed or first-accessed state. Accordingly, page table entries that are only used once are prevented from being cached and potentially more useful address translations are not evicted from the address translation cache.

If subsequent accesses to the page table entry are performed, the state tracking circuitry updates the access state to a multi-accessed state, which is interpreted to indicate that the page table has been accessed a sufficient number of times to be worth storing in the address translation cache. Accordingly, the control circuitry is responsive to the page table entry being in the multi-accessed state to allow the address translation to be cached in the address translation cache. As above, this may result in an existing address translation being evicted.

The precise number of accesses required for the state tracking circuitry to update the access state to the multi-accessed state is dependent on the particular implementation and may be any number greater than one. It will be appreciated that the state tracking circuitry may update the access state to one or more intervening states between the first-accessed state and the multi-accessed state depending on the number of accesses required to update the access state to the multi-accessed state. For example, where the access state is updated to the multi-access state after three accesses, the state tracking circuitry may also update the access state to a second-accessed state to track the number of accesses from the first-accessed state (one access), to the second-accessed state (two accesses) and finally to the multi-accessed state (three accesses).

Due to the additional latency in address translation caused by performing a page table walk, it is possible for multiple pending memory accesses to require the same address translation that is currently being used by another memory access. In such cases, it is useful to be able to identify when the address translation is already in use. Accordingly in some examples, the state tracking circuitry also maintains a usage state of the page table entry in addition to maintaining the access state. The usage state indicates whether the page table entry is in use, and specifically whether a memory access using the address translation is currently in progress.

In particular, the state tracking circuitry is configured to update the usage state to indicate that the memory access is in progress in response to an initiation of the memory access. The initiation of the memory access may occur when a memory access request is received from, for example, a load/store unit in a data processing apparatus. This memory access request triggers a page table walk to locate the page table entry, at which point the usage state can be updated to indicate that the address translation is in use.

The state tracking circuitry is configured to then update the usage state to indicate that the memory access is no longer in progress in response to completion of the memory access using the address translation. The completion of the memory access may be indicated differently depending on the type of memory access. For example, a load access is completed when the target data has been loaded from memory and forwarded to the requesting device, whereas a store access is completed when the target data has been written in memory. In response to the completion, the usage state can be updated or reset to indicate that the memory access is no longer in progress. In some examples, the access state may be updated at the same time as the usage state is reset. Accordingly, the access state may be updated, for example, to the first-accessed state after the access has been completed.

As mentioned above, it is possible that multiple pending memory accesses will be requested to the same address. It is recognised that in these scenarios, it would be useful to cache the address translation immediately so that each pending memory access can be performed faster. Accordingly, if upon accessing the page table entry the usage state already indicates that a memory access is in progress, then the state tracking circuitry updates the access state into the multi-accessed state, regardless of how many accesses have been made to the page table entry. The control circuitry then allows the address translation to be cached in the address translation cache as described above.

In some examples, the state tracking circuitry is configured to maintain a plurality of bits to represent the access state and the usage state. The plurality of bits allows for relatively low overhead for the state tracking circuitry to maintain the various states since the states can be updated by changing the value of one or more of the plurality of bits.

In some examples, the state tracking circuitry is configured to maintain the plurality of bits such that a least significant bit of the plurality of bits represents the usage state. With this arrangement, the states can be maintained separately, such that the usage state is equivalent to a binary flag to indicate "in progress" or "not in progress", whereas the access state is a number of bits, the binary value of which may be equivalent to the number of accesses to the page table entry.

In examples where the least significant bit represents the usage bit, the state tracking circuitry can update the usage bit by incrementing the value represented by the plurality of bits in response to an access to the page table entry. In such examples, when the page table entry is accessed, the least significant bit may be changed from 0 to 1, where 1 is used to indicate that a memory access using the address translation is "in progress" and 0 is used to indicate that a memory access using the address translation is "not in progress". It will be appreciated that some examples may use 0 and 1 to indicate the opposite to the above.

When the memory access using the address translation is completed, the state tracking circuitry can also update the usage bit by incrementing the value represented by the plurality of bits. Accordingly, when the least significant bit (representing the usage state) is a 1 to indicate "in progress", incrementing the value of the plurality of bits will change the usage state to 0 to indicate "not in progress". Additionally, since the plurality of bits represents both the access state and the usage state, incrementing the plurality of bits such that the usage state changes from 1 to 0 means that the least significant bit of the access state (i.e. the second least significant bit of the plurality of bits) would be changed from 0 to 1. Accordingly, both the usage state can be updated to indicate "not in progress" and the access state can be updated to the first-accessed state in one operation.

In some examples, the state tracking circuitry is configured to increment the value represented by the plurality of bits atomically. This protects the usage state from being erroneously updated multiple times in the case where multiple page table walks attempt to access the same page table entry. This may be more likely in examples that make use of software-based page table walks, where multiple threads could perform a page table walk to the same page table entry. In such examples, a first page table walk will access the page table entry and attempt to atomically increment the plurality of bits to update the usage state to indicate that a memory access is "in progress". If the atomic increment is completed, then a second page table walk will access the page table entry and identify that the address translation is in use. This may cause the access state to be immediately updated to the multi-access state as described above.

On the other hand, if the second page table walk attempts to access the page table entry before the atomic increment by the first page table walk is complete, then the second page table walk is prevented from updating the usage state. In some examples, the atomic increment by the first page table walk may be aborted or an exception may be raised.

When representing the access state of the page table entry using a plurality of bits, the state tracking circuitry may update the access state to the multi-access state by saturating the plurality of bits, so that all of the bits in the plurality of bits are set (e.g. to a value of 1). In this way, the number of accesses required for the plurality of bits to saturate can be predetermined by the number of bits in the plurality of bits. In an example where the state tracking circuitry maintains four bits to represent the access state and the usage state, one bit is used to represent the usage state, and three bits are used to represent the access state. Accordingly, there will be a maximum of eight unique access states for the page table entry (i.e. the non-accessed state, the first-accessed state, a second-accessed state, a third-accessed state and so on). The multi-accessed state is represented by all four bits being set.

In some examples, the state tracking circuitry is configured to maintain the access state to indicate a number of accesses to the page table entry. In such examples, the access state may be represented by a counter that is incremented in response to an access to the page table entry. The different access states that can be set by the state tracking circuitry are then represented by a value of the counter.

The control circuitry may be responsive to the value of the counter to control caching of the address translation in the address translation cache. In particular, when the counter is less than a predetermined threshold, the control circuitry is configured to suppress caching of the address translation in the address translation cache. Accordingly, the predetermined threshold can be implemented such that when a page table entry has been accessed a number of times equal to the predetermined threshold, the page table entry is considered sufficiently important to cache in the address translation cache. Similarly, page table entries that are only accessed once or a number of times less than the predetermined threshold are not considered sufficiently important. This causes the apparatus to use the address translation cache more efficiently because important address translations are cached, whereas less important address translations are not cached.

When an address translation is no longer required, for example if software corresponding to the virtual address space is terminated or a device corresponding to the device address space is disconnected, the address translation may be removed from the page tables in memory. When this occurs, it is necessary to invalidate any copies of the address translation that has been cached in the address translation cache to prevent subsequent processes or devices from accessing an incorrect part of physical memory using stale address translations.

The removal of an address translation may be triggered by a supervisory software process such as an operating system or hypervisor that then issues the software-generated invalidation signal to invalidation circuitry. It is recognised that frequent invalidations can cause a significant amount of overhead that reduces the performance of other address translation processes.

One possible approach to reducing this overhead could be to defer invalidations after an address translation is removed. For example, a global invalidation may be issued to invalidate all address translations cached in the address translation cache periodically instead of issuing individual invalidations for a select few address translations. This approach brings two prominent disadvantages. Firstly, by using global invalidations, any useful address translations cached in the address translation cache are also invalidated, meaning that the potentially improved performance by caching is lost until those addresses are translated again. Secondly, the supervisory process must track stale address translations that have not yet been invalidated to prevent the associated physical memory address from being used, thus further increasing the overhead required when invalidating address translations.

Another possible approach would be to optimise the above approach by configuring the supervisory process to allow the associated physical memory address to be used before the stale address translations have been invalidated. However, this introduces a potential vulnerability because the stale address translations could be used to access a region of physical memory by a process that should not be able to access that region of physical memory.

Accordingly, the present techniques provide invalidation circuitry configured to cause the address translation in the address translation cache to be invalidated in response to a software-generated signal, wherein the software-generated signal is suppressed in response to a determination that the address translation entry has not been cached in the address translation cache. In particular, it is recognised that when the address translation is not actually stored in the address translation cache, it is not necessary to issue the software-generated invalidation signal. Accordingly, the drawbacks of the abovementioned approaches can be avoided.

The determination that the address translation has not been cached in the address translation cache may be performed in dependence on the access state of the page table entry being the non-accessed state or the first-accessed state. In particular, software that generates the software-generated signal will be able to ascertain that the control circuitry would have suppressed the address translation from being cached in the address translation cache if the page table entry is in the non-accessed or first-accessed state. Accordingly, since the address translation is known to have not been cached in the address translation cache, an invalidation is not required.

Alternatively, if for example the access state of the page table entry is the multi-accessed state, the control circuitry would have allowed caching of the address translation. Accordingly, it would be necessary to issue the software-generated signal to cause the invalidation circuitry to invalidate the address translation.

In some examples, the state tracking circuitry is configured to store the access state in association with the page table entry in memory. Indeed, the access state may be stored as a field within the page table entry itself.

In accordance with another example configuration there is provided a method comprising maintaining an access state of a page table entry specifying an address translation; updating the access state of the page table entry from a non-accessed state to a first-accessed state in response to an access to the page table entry; and controlling caching of the address translation in an address translation cache, wherein in response to the access state of the page table entry being the non-accessed state or the first-accessed state, suppressing caching of the address translation in the address translation cache.

In accordance with another example configuration there is provided a non-transitory computer-readable medium to store computer-readable code for fabrication of an apparatus comprising: state tracking circuitry configured to maintain an access state of a page table entry specifying an address translation, wherein the state tracking circuitry is configured to update the access state of the page table entry from a non-accessed state to a first-accessed state in response to an access to the page table entry; and control circuitry configured to control caching of the address translation in an address translation cache, wherein in response to the access state of the page table entry being the non-accessed state or the first-accessed state, the control circuitry is configured to suppress caching of the address translation in the address translation cache.

Particular embodiments will now be described with reference to the figures.

FIG. 1 illustrates an example of a data processing apparatus 1 (e.g. a data processing system, integrated circuit or system or chip) having at least one processor, in accordance with one embodiment. In this example, the processor is a central processing unit (CPU) 10, but other examples of processors include a graphics processing unit (GPU) or a neural processing unit (NPU). The CPU 10 comprises processing circuitry 11 to perform processing operations in response to program instructions. It will be appreciated that the processing circuitry in FIG. 1 is simplified and the CPU 10 may include additional processing pipeline stages such as a fetch stage, an instruction decoder, a rename stage, and so on. The CPU 10 also comprises a data cache 12 for caching data from memory 40 for faster access by the processing circuitry 11. It will also be appreciated that the CPU 10 may include further caches in a cache hierarchy, such as an L2 or L3 cache.

The CPU 10 further comprises a memory management unit (MMU) 13 that functions as address translation circuitry for translating virtual addresses specified by instructions executed by the processing circuitry 11 into physical addresses identifying locations in memory 40. The MMU 13 includes at least one address translation cache, such as TLB 14 for storing address translations that depend on page table structures stored in memory 40. The page table structures include page descriptors defining the address mappings between virtual and physical addresses and may also define memory access permissions that define whether certain software processes executing on processing circuitry 4 are allowed to access certain addresses. The MMU 13 may support 2-stage address translation where the mapping of a virtual address to a physical address depends on both stage 1 address translation data which maps the virtual address to an intermediate physical address and stage 2 translation data which maps the intermediate physical address to a physical address. The stage 1 address translation data may be set by an operating system or virtual machine, whereas stage 2 translations may only be set by more secure processes such as a hypervisor.

The CPU 10 is an example of a requester device that is capable of executing program instructions. While FIG. 1 only shows one such requester device, it will be appreciated that the data processing apparatus 1 could have two or more requester devices, which may include further CPUs or could include other types of processor as described above.

In addition to the CPU 10 or other requester devices with an integrated MMU 13, the data processing apparatus 1 may also include requester devices 20 that do not have an integrated MMU. Therefore, for accessing memory and providing address translation functionality, such devices 20 communicate with the rest of the system via an input/output memory management unit (IOMMU) 23. The IOMMU may perform address translation in a similar way to the MMU 13, except for translating an input/output virtual address (also known as a device address) into physical address. The IOMMU 23 includes another address translation cache (i.e. TLB 14) to store address translations translated by the IOMMU 23.

The devices 20 that access memory via the IOMMU 23 may include a device 20-1 with a local cache 22 and a device 20-2 without a cache. For example, devices 20 could include a display controller for controlling display of image frames, a network controller for controlling input or output of data via a network, a hardware accelerator for performing certain dedicated processing functions in a more efficient manner than can be achieved using software on generic processing circuitry such as CPU 10, and so on.

All of the requester devices 10, 20 communicate with each other via an interconnect 30 that is responsible for routing transactions between the requester devices and memory 40. Interconnect 30 may also be responsible for managing coherency between data cached in local caches 12, 22. It will be appreciated that FIG. 1 is a simplified diagram and the apparatus may include many other components not shown for conciseness.

The MMU 13 and IOMMU 23 both include state tracking circuitry 15, control circuitry 16 and invalidation circuitry 17 according to the present techniques. Since these components may be substantially the same between the MMU 13 and IOMMU 23, the following description will refer only to the MMU 13. Although it will be appreciated that the same features are also present in the IOMMU 23.

The state tracking circuitry 15 is configured to maintain an access state of the page table entries in the page table structures described above. In particular, in addition to a page descriptor defining an address translation, a page table entry also includes an access state. The access state may be stored in association with the page table entry. Indeed, in some examples, the access state is a field within the page table entry itself. Accordingly, the access state may be managed by the state tracking circuitry 15 when the page table entry is accessed.

The access state is maintained to indicate the number of times that the page table entry has been accessed. In particular, the page table entry is initially created in a non-accessed state indicating that the page table entry has not been accessed. After the page table entry is accessed, the state tracking circuitry updates the access state from the non-accessed state to the first-accessed state indicating that the page table has been accessed once. After a sufficient number of accesses, the state tracking circuitry updates the access state to the multi-accessed state.

The control circuitry 16 included in the MMU 13 controls caching of address translations in the TLB 14, and in particular controls which address translations are allowed to be cached and which address translations are prevented from being cached. According to the present techniques, when controlling whether to cache the address translation from a particular page table entry, the control circuitry 16 will check the access state of the page table entry. If the access state is in any state other than the multi-access state (i.e. in the non-accessed state or first-accessed state), then the control circuitry 16 suppresses caching of the address translation. On the other hand, if the access state is in the multi-accessed state, then the control circuitry 16 allows the address translation to be cached in the TLB 14. Accordingly, an address translation specified by a particular page table entry is allowed to be cached in the TLB 14 if it has been accessed a sufficient number of times.

Figure 2:
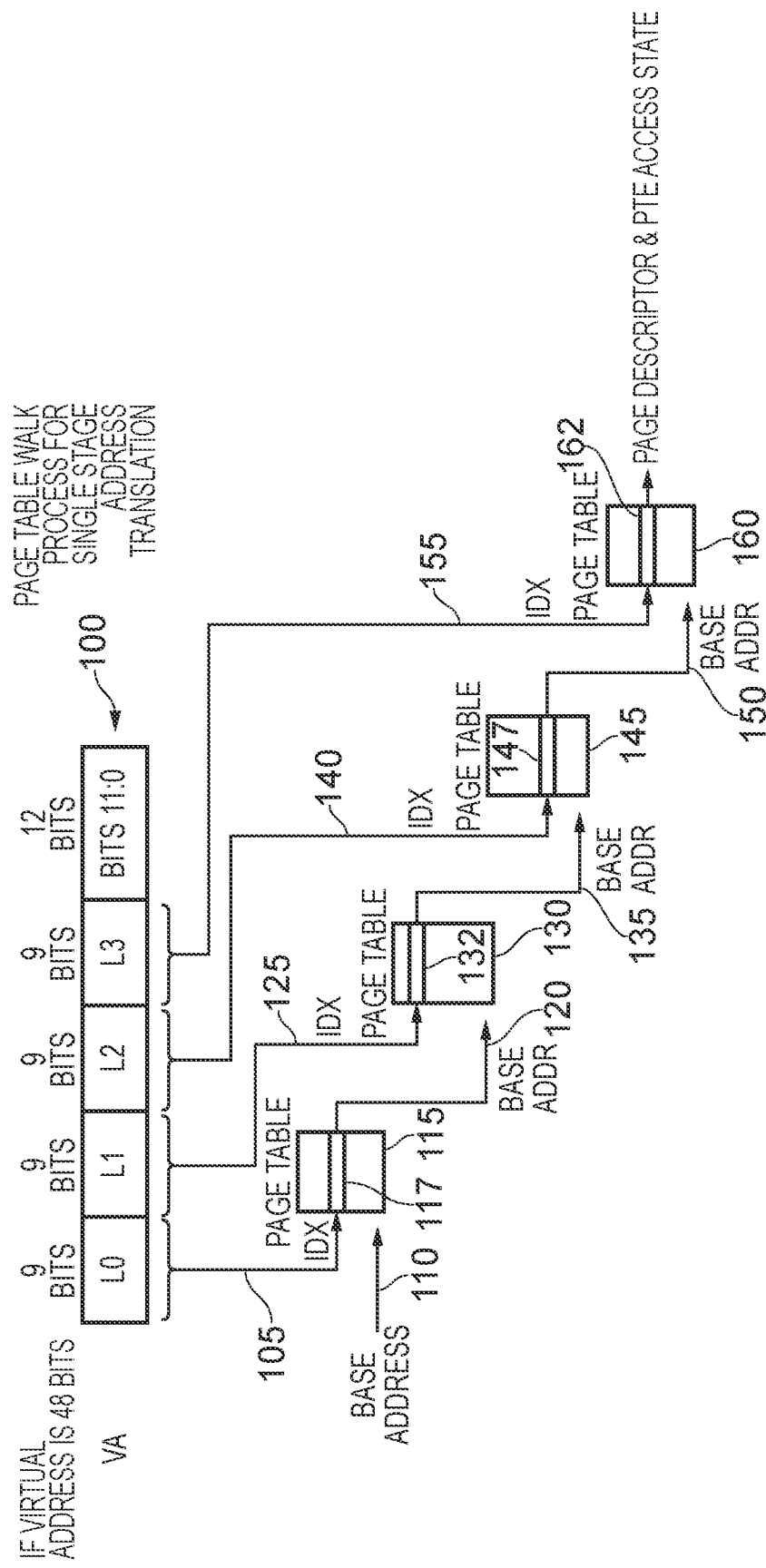
FIG. 2 illustrates the steps of performing a page table walk to access a page table entry.

The page table entry is accessed in response to receiving a virtual address from, for example, a memory request issued by processing circuitry 11. The process for locating the correct page table entry is known as a page table walk. FIG. 2 is a diagram schematically illustrating such a page table walk process performed by the MMU 13 and/or IOMMU 23 to access a page table entry. Note that this example assumes that there is a single stage address translation mechanism being used. In this example, it is assumed that a virtual address 100 received from processing circuitry 11 is 48 bits, and those bits are arranged in 9 bit portions associated with different levels of the page table walk process, with the 12 least significant bits denoting a page offset.

At the start of the page table walk process, a base register is accessed to identify a base address 110 that is used to identify the page table 115. The 9 bits 105 associated with level zero of the page table walk process are used to identify an index into that page table 115, and hence identify an intermediate level descriptor 117. This intermediate level descriptor 117 provides a base address 120 that is used to identify a further page table 130, with the level one virtual address bits 125 being used to identify an index into that table. This identifies the intermediate level descriptor 132 that provides a further base address 135 to identify the page table 145. The level 2 virtual address bits 140 are then used to provide an index into that table 145 in order to identify the intermediate level descriptor 147, which then provides the base address 150 that identifies a final page table 160. The level 3 virtual address bits 155 then provide an index into that table 160, identifying a final level page table entry 162 containing a page descriptor and an access state of the page table entry.

With the information provided by the page descriptor, it is then possible to generate the address translation that may be cached in one of the entries of the TLB 14 according to the control of the control circuitry as described above. The virtual address is then converted into a physical page number and hence allowing the required physical address in memory to be identified. This then enables the particular item of data (or instruction) corresponding to the virtual address to be accessed by the processing circuitry 11 by issuing the required physical address to memory 40 via the interconnect 30.

Figure 3:
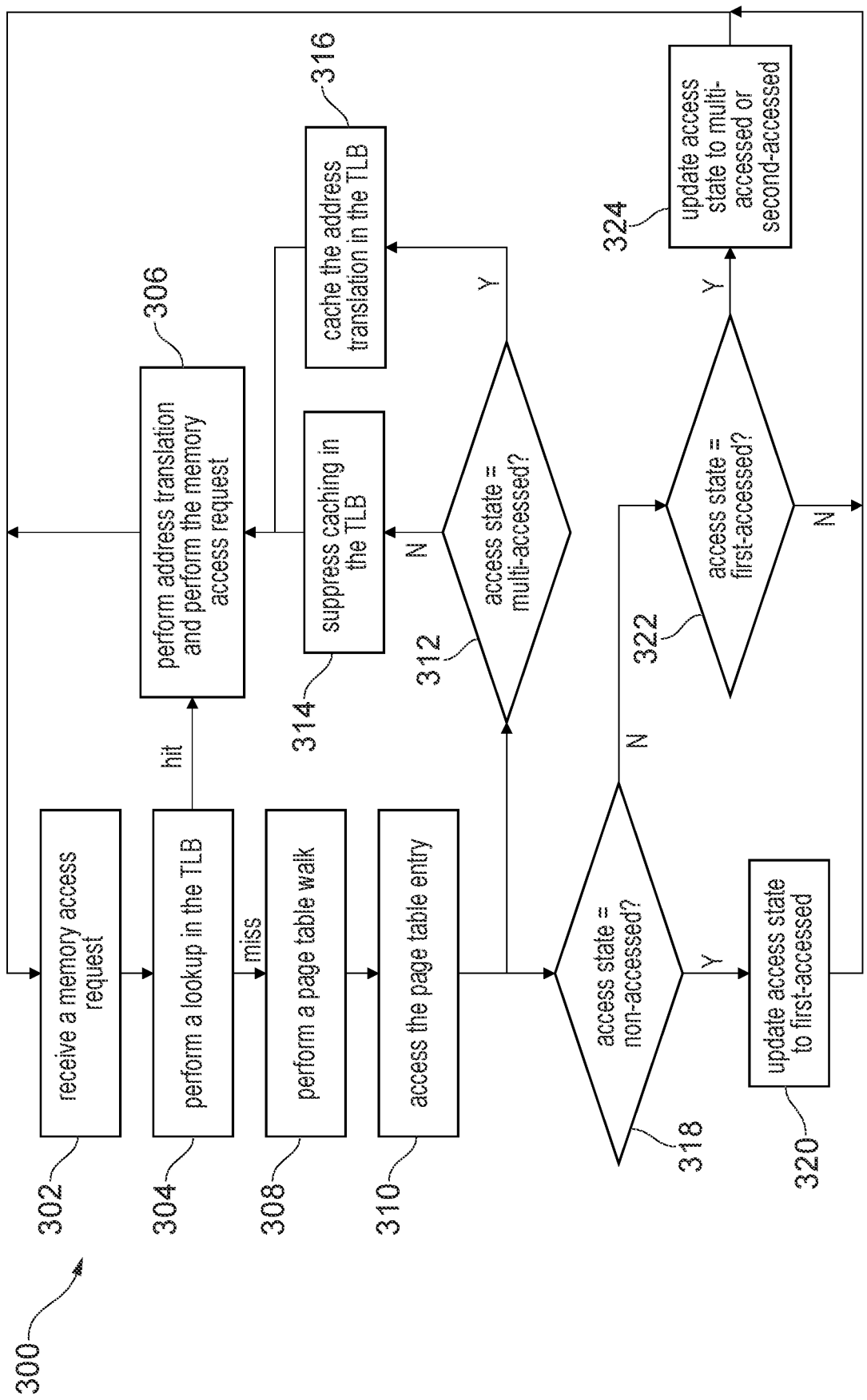
FIG. 3 shows a sequence of steps performed to manage the access state of a page table entry.

FIG. 3 illustrates a method 300 performed by MMU 13 in accordance with the present techniques. The method 300 begins at step 302 with receiving a memory access request specifying a virtual address from the processing circuitry 11. A lookup is performed in the TLB 14 at step 304 to check if an address translation has already been cached for this virtual address. If so, then there is a hit in the TLB 14 and at step 306 the virtual address is translated to a physical address and the memory access is performed. If the address translation is not already cached in the TLB 14, then the lookup results in a miss and at step 308, a page table walk such as that shown in FIG. 2 is performed.

After the page table walk, the page descriptor and access state is obtained when accessing the page table entry at step 310. In step 312, the access state is checked as to whether the page table entry is in the multi-accessed state or not. If not, then the control circuitry 16 suppresses caching of the address translation in the TLB 14 at step 312. If the access state is in the multi-accessed state, then the control circuitry 16 allows the address translation to be cached in the TLB 14. Regardless of whether the address translation is cached, the address translation and resulting memory access request is still performed in step 306.

In addition to the caching control by the control circuitry 16, the state tracking circuitry 15 updates the access state as necessary according to the present techniques. In particular, at step 318 the state tracking circuitry 15 checks the current access state of the page table entry. If the access state is in the non-accessed state, then the state tracking circuitry 15 updates the access state to the first-accessed state at step 320. However, if the access state is not in the non-accessed state, but rather the first-accessed state at step 322, then the state tracking circuitry 15 updates the access state to either the multi-accessed state or an intervening second-accessed state at step 324.

In some examples, the access state may take several intervening states between the first-accessed state and the multi-accessed state. In particular, if the state tracking circuitry is configured to update the access state to the multi-accessed state after four accesses, then the access state could take the non-accessed state, the first-accessed state, a second-accessed state and a third-accessed state before being updated to the multi-accessed state. It will therefore be appreciated that the method 300 could include a number of further steps after 322 and 324 to check if the access state is any one of these intervening states and to update the access state to the next state (i.e. updating the second-accessed state to the third-accessed state, or updating the third-accessed state to the multi-accessed state). After the state tracking circuitry 15 has completed updating the access state, the process then returns to step 302 to await the next memory access request from the processing circuitry 11.

In the above examples, the access state as maintained by the state tracking circuitry 15 allows the control circuitry 16 to more effectively control when particular address translations should be allowed to be cached or not. In particular, page table entries that have only been accessed once (or any number of times below the number of accesses at which the multi-access state is set) are not cached in the TLB 14. Therefore, the entries of the TLB are more likely to hold address translations that have previously been accessed several times. Due to the principle of locality, the CPU 10 is likely to continue to access those addresses repetitively over a period of time. Therefore, the present techniques cause the MMU 13 to make more efficient use of the TLB 14 thus improving the performance of the data processing apparatus 1.

In some examples, the state tracking circuitry also maintains a usage state of the page table entry. The usage state indicates whether a memory access using the address translation is currently in progress. This may be particularly useful if, for example, a page table entry is accessed by two different page table walk processes at approximately the same time. For example, the devices 20-1 and 20-2 may request access to the same address causing two page table walk processes to attempt to translate the address.

Figure 4:
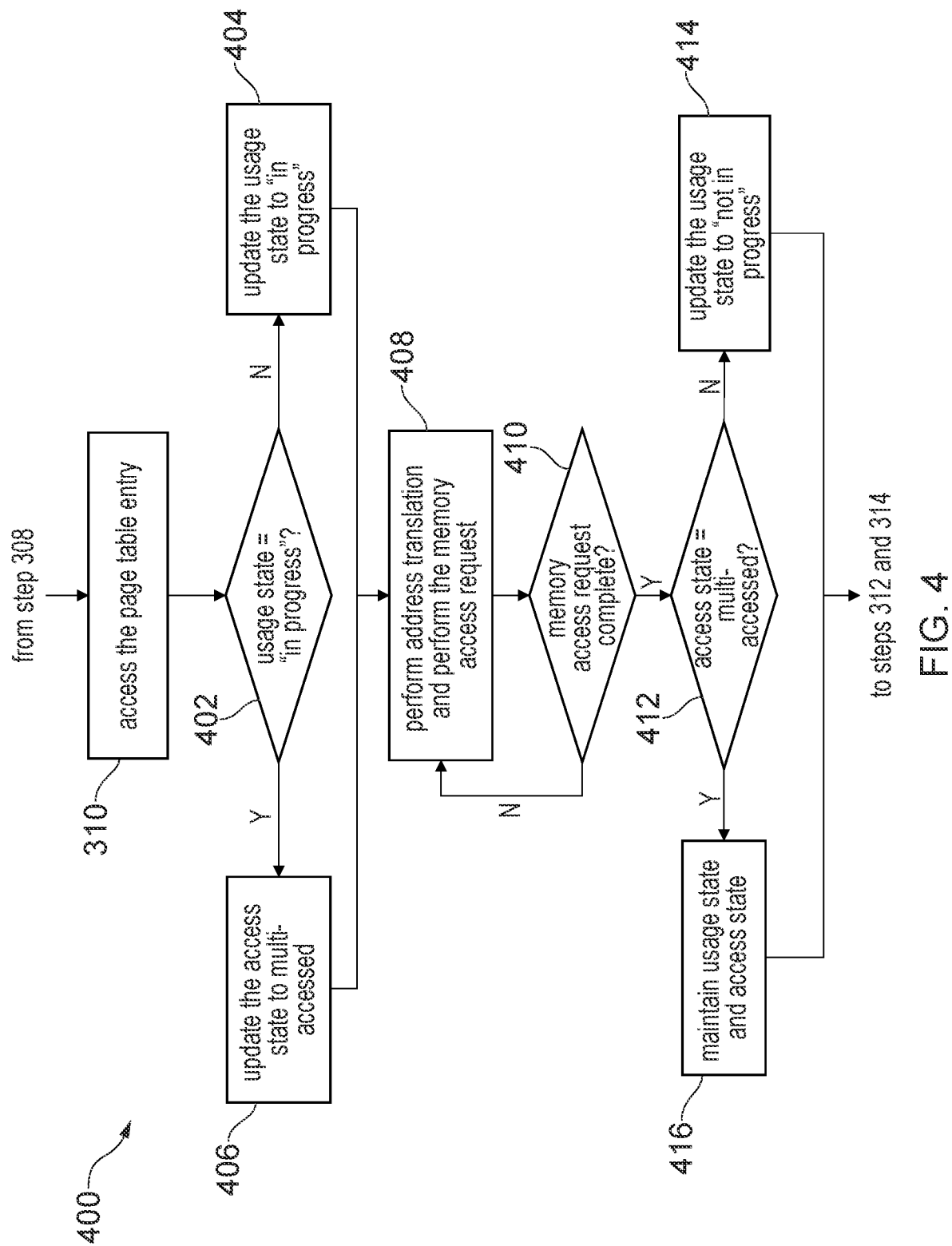
FIG. 4 shows a sequence of steps performed to manage the usage state of a page table entry.

FIG. 4 illustrates a method 400 that may be included in method 300 between steps 310 and 312. The process begins at the point where the page table entry is accessed in step 310 after the page table walk is performed. A determination is made as to whether the usage state indicates that a memory access using the address translation is currently in progress at step 402. If not, then the state tracking circuitry 15 updates the usage state to "in progress" to indicate that the address translation specified by the page table entry is now being used.

However, if the usage state already indicates that a memory access using the address translation is in progress, then it can be seen that at least two different memory accesses require this address translation. This can be used as an indication that the address translation is likely to be frequently accessed and hence would be beneficial to cache in the TLB 14 for quicker address translation. Accordingly, if the usage state indicates that the page table entry is already being used, then in step 406, the state tracking circuitry 15 updates the access state to the multi-accessed state immediately, regardless of how many times the page table entry has been accessed.

After either of steps 404 and 406, the address translation and memory access request is performed in step 408 (instead of in step 306 in FIG. 3). The process then waits until the memory access has been completed. After the memory access has been completed in step 410, a determination is made as to whether the access state is the multi-accessed state in step 412. If not, for example because the access state is in the first-accessed state or an intervening access state, then the state tracking circuitry updates the usage state to indicate that a memory access using the address translation is not currently in progress at step 414. The process then continues to the management of the access state by the state tracking circuitry 15 as described in steps 318 to 324 of FIG. 3. Moreover when the process continues, caching of the address translation in the TLB 14 is suppressed in step 314 because the access state is also not in the multi-accessed state at step 312.

If the access state is in the multi-accessed state in step 412, then the state tracking circuitry 15 maintains the usage state and access state. In particular, the usage state is maintained as "in progress" and the access state is maintained as the multi-accessed state. Accordingly, when the process continues to step 312 of FIG. 3, the page table entry will be cached in the TLB 14 at step 316.

Management of the usage state according to the above example allows the apparatus to detect when multiple page table walk processes are attempting to access the same page table entry. In response to detecting an access to a page table that is in use, the address translation is allowed to be cached immediately. This allows any pending page table walk processes to be avoided since the address translation is available in the TLB 14.

In some examples, the state tracking circuitry 15 maintains the access state and the usage state together as a plurality of bits. These bits may be stored in a state field of the page table entry to allow an efficient way to track the states without adding a significant memory burden when creating or storing the page table structures. When using a plurality of bits, one example configuration is that the least significant bit is used to represent the usage state and the higher order bits are used to represent the access state. Accordingly, both states can be updated according to the present techniques by incrementing the value represented by the plurality of bits at the appropriate time.

FIG. 5 illustrates a table showing an example where the access state and usage state are represented by three bits. It will be appreciated however that the states could be represented using any number of bits depending on the particular implementation. When the page table entry is initialised, for example by an operating system, the states are represented by 0b000 to show that the access state is in the non-accessed state and the usage state indicates that the page table entry is not in use.

In response to a first access to the page table entry, the value represented by the three bits is incremented to 0b001. This increment is equivalent to the update in step 404 of FIG. 4 to update the usage state to indicate that the page table entry is in use. Since the first access has not yet been completed, the access state remains in the non-accessed state. When the first access is completed, the value represented by the three bits is incremented again to 0b010. This increment is equivalent to the updates in steps 414 and 320. Accordingly, the usage state indicates that the page table entry is no longer in use and the access state is updated to the first-accessed state. By maintaining the states using the plurality of bits in this way, both states can be updated at the same time with little overhead.

In response to a second access to the page table entry, the value represented by the three bits is incremented again to 0b011 to indicate that the page table entry is in use and the access state is in the first-accessed state. Similarly, upon completion of the second access to the page table entry, the value represented by the three bits is incremented again to 0b100 to indicate that the page table entry is not in use and the access state is in the second-accessed state.

In response to a third access to the page table entry, the value represented by the three bits is incremented again to 0b101. Upon completion of the third access, the value represented by the three bits is incremented again to 0b110. In this example, the access state "11" is indicative of the multi-accessed state. Accordingly, on a fourth access, the value represented by the three bits is finally incremented to 0b111 and the control circuitry identifies that the page table entry is in the multi-accessed state. Accordingly, the address translation is allowed to be cached in the TLB 14 as described in previous examples.

To prevent two different page table walk processes from incrementing the value represented by the plurality of bits at the same time (and thus causing the usage state to indicate the wrong state), the increments may be performed atomically. Accordingly, if the states are currently being incremented by a first page table walk process, a second page table walk process will be unable to increment the states. In some examples, an attempt to increment the states while an atomic increment is taking place could cause the page table entry to revert to a prior state and/or an exception could be raised.

It will be appreciated that, when considering only the bits representing the access state, they act as a counter for counting the number of accesses to the page table entry. Additionally, the control circuitry suppresses caching of the address translation until the counter reaches a predetermined threshold.

The predetermined threshold may be defined as the number at which the plurality of bits are saturated (i.e. all bits are equal to 1), in which case the predetermined threshold is inherently implemented when creating the page table entry. In general, the predetermined threshold can be defined by $N=2^{b-1}$, where N is the predetermined threshold, and b is the number of bits representing the access state and the usage state. In the example of FIG. 5, it can be seen that the predetermined threshold is equal to four (i.e. $2^{3-1}$)

Figure 6:
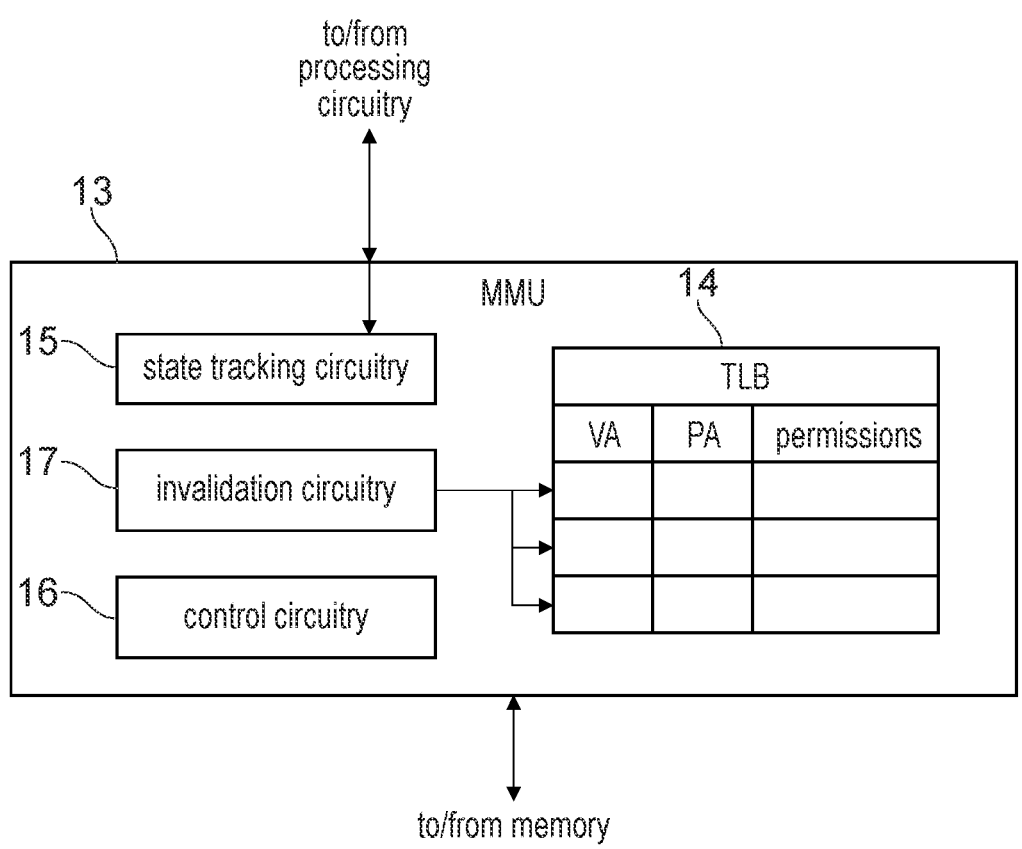
FIG. 6 schematically illustrates an apparatus capable of performing an invalidation of cache entries according to some example embodiments.

When a page table entry is no longer required, an operating system or hypervisor may remove the page table entry from the page table structures. When doing so, it is necessary to invalidate any local copies of the address translation cached in address translation caches such as the TLB 14. FIG. 6 illustrates an MMU such as the MMU 13 of FIG. 1 in more detail and shows the invalidation circuitry 17 provided to cause any one or more entries of the TLB 14 to be invalidated. Since the creation and removal of address translation data would typically be controlled by an operating system or a hypervisor running on the CPU 10 (and in particular on the processing circuitry 11), the invalidation circuitry is configured to respond to a software-generated invalidation signal that targets one or more entries for invalidation in the TLB 14.

It is recognised that frequent invalidation of entries in the TLB 14 often causes a reduction in performance because an invalidation must be synchronised across the entire data processing system 1 (i.e. in both the MMU 13 and IOMMU 23 and any page table structures in memory 40). By the use of the present techniques described above, the access state maintained by the state tracking circuitry 15 can be used to determine that a particular address translation has not been cached in the TLB 14. In particular, if the access state is any state other than the multi-accessed state, then it is known that the address translation has not been cached, because caching would have been suppressed by the control circuitry 16. Accordingly, the access state may be used to determine whether an invalidation is actually necessary.

Figure 7:
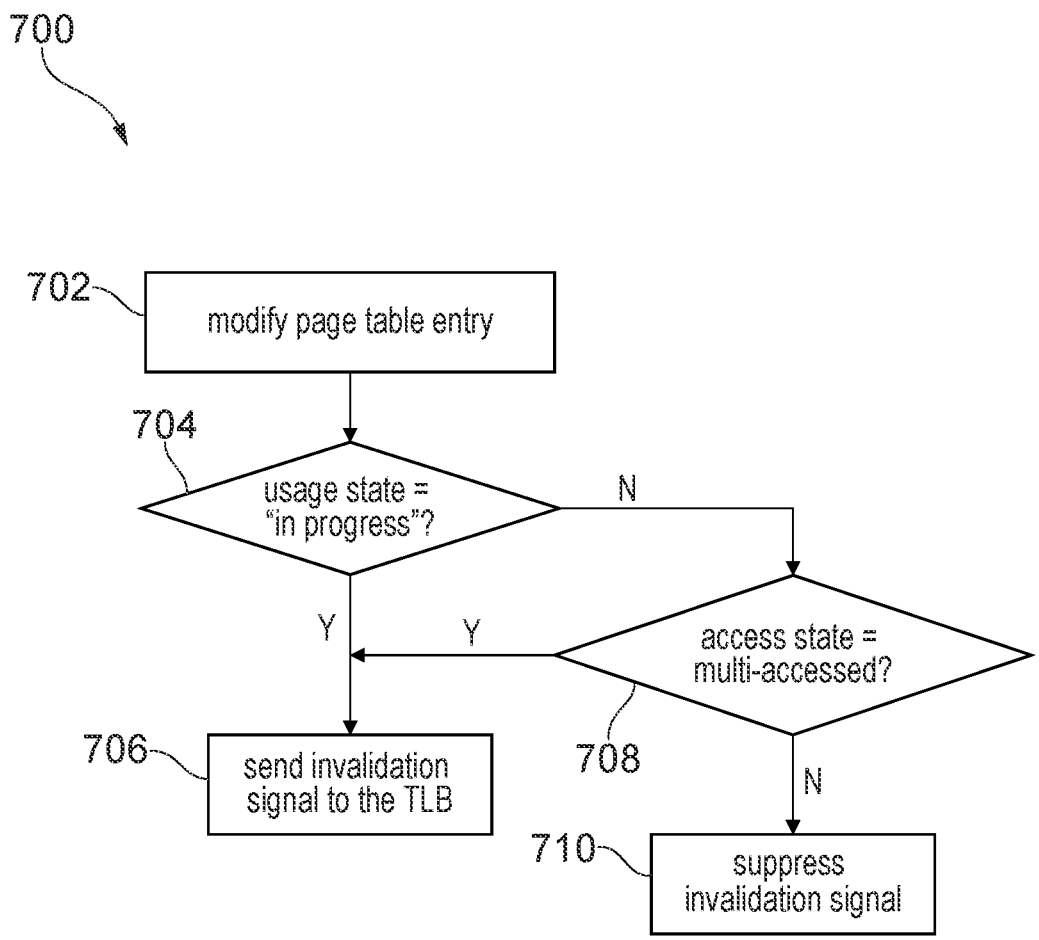
FIG. 7 shows a sequence of steps performed to determine whether to suppress an invalidation signal.

FIG. 7 illustrates a method 700 for determining whether or not to send a software-generated invalidation signal or not. The process begins at step 702 when a page table entry is modified, for example by modifying the mapping between virtual address and physical address defined in the page table entry or by deleting the page table entry.

In examples where the state tracking circuitry 15 maintains a usage state, step 704 determines whether the usage state indicates that a memory access using the address translation is currently in progress. If so, then the MMU 13 may have local copies of the address translation stored in buffers as part of the address translation process. Therefore, a software-generated invalidation signal is issued to the invalidation circuitry to cause any local copies of the address translation to be invalidated.

If the usage state does not indicate that the address translation is currently in use by a memory access, then it is determined whether the access state is in the multi-accessed state at step 708. If so, then it is possible that the address translation has been cached in the TLB 14. Accordingly, it is necessary to send an invalidation signal to cause the TLB 14 to invalidate entries containing that address translation. On the other hand, if the access state is not in the multi-accessed state (e.g. the access state is the non-accessed state, the first-accessed state, or any intervening access state described previously), then it is known that the control circuitry 16 will have suppressed caching of the address translation in the TLB 14. Accordingly, it is not necessary to send an invalidation signal and the invalidation signal can be suppressed in step 710. By suppressing the invalidation signal based on the access state in this way, it is possible to avoid the loss of performance caused by invalidating potentially useful address translations stored in the TLB 14, for example when using the deferral and global invalidation techniques described previously.

Even in examples where the deferral global invalidation techniques are not used, performance can still be improved. In particular, fewer page table entries would be cached in the address translation cache because some page table entries may not be used a sufficient number of times to be updated into the multi-accessed state. Therefore, fewer invalidation signals would be required when those page table entries are removed from the page table structures. This improvement in performance may be further magnified in examples where the page table entries relate to device addresses for devices 20 of FIG. 1 as described previously. In such examples, many device addresses are typically used only a few times, therefore the present techniques advantageously avoid the need to generate an invalidation signal for page table entries corresponding to those device addresses.

Figure 8:
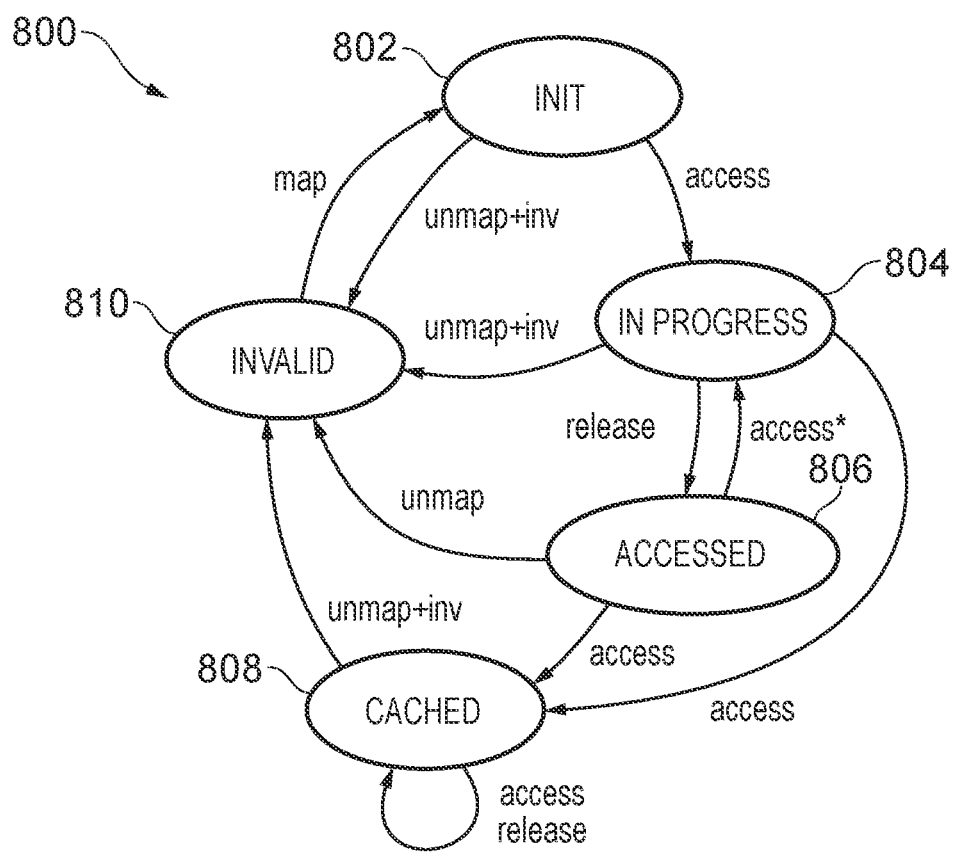
FIG. 8 illustrates a directed graph with the modification of the states of a page table entry.

FIG. 8 illustrates a directed graph 800 to illustrate a general implementation of the present techniques for a given page table entry. INIT 802 represents a page table entry being created in the page table structures. Upon an access to the page table entry, the page table entry transitions to IN PROGRESS 804 (i.e. the usage state indicates that the address translation is in use by a memory access). When the page table entry is released (i.e. the memory access is completed), the page table entry transitions to ACCESSED 806. There can be any number of transitions between IN PROGRESS 804 and ACCESSED 806 depending on how many subsequent accesses (indicated by access*) are required for the state tracking circuitry 15 to update the access state to the multi-accessed state.

When the page table entry has been accessed a sufficient number of times, the page table entry transitions to CACHED 808. This indicates that the access state has been updated to the multi-accessed state and the control circuitry 16 has allowed the address translation to be cached in an address translation cache.

At any time during this process, the page table entry may be removed by unmapping the translation between virtual and physical addresses. The page table entry therefore transitions to INVALID 810. As described above, an invalidation is not necessary if the page table entry has been ACCESSED 806 but not CACHED 808. Accordingly, invalidations occur less frequently and a loss of performance may be avoided.

Figure 9:
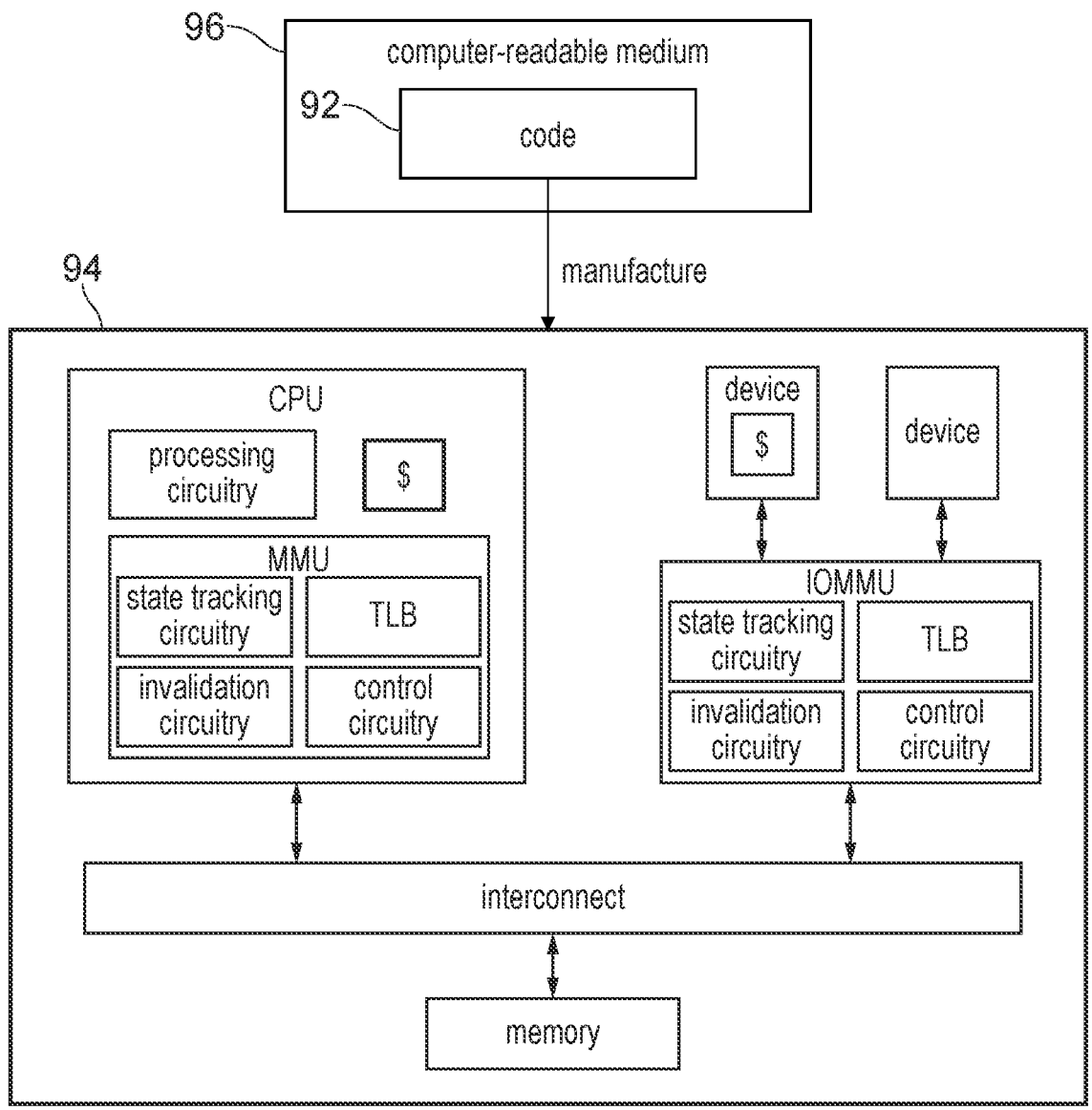
FIG. 9 schematically illustrates a computer-readable medium for manufacturing an apparatus according to some example embodiments.

FIG. 9 illustrates an example of concepts described herein embodied in computer-readable code 92 for fabrication of an apparatus 94 that embodies the described concepts. For example, the computer-readable code 92 can be used at one or more stages of a semiconductor design and fabrication process, including an electronic design automation (EDA) stage, to fabricate an integrated circuit comprising the apparatus 94 embodying the concepts. The above computer-readable code 92 may additionally or alternatively enable the definition, modelling, simulation, verification and/or testing of an apparatus 94 embodying the concepts described herein.

For example, the computer-readable code 92 for fabrication of an apparatus 94 embodying the concepts described herein can be embodied in code defining a hardware description language (HDL) representation of the concepts. For example, the code 92 may define a register-transfer-level (RTL) abstraction of one or more logic circuits for defining an apparatus 94 embodying the concepts. The code 92 may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code 92 may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code 92 may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code 92 a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

Such computer-readable code 92 can be disposed in any known transitory computer-readable medium 96 (such as wired or wireless transmission of code over a network) or non-transitory computer-readable medium 96 such as semiconductor, magnetic disk, or optical disc. An integrated circuit fabricated using the computer-readable code 92 may comprise components such as one or more of a central processing unit, graphics processing unit, neural processing unit, digital signal processor or other components that individually or collectively embody the concept.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 10:
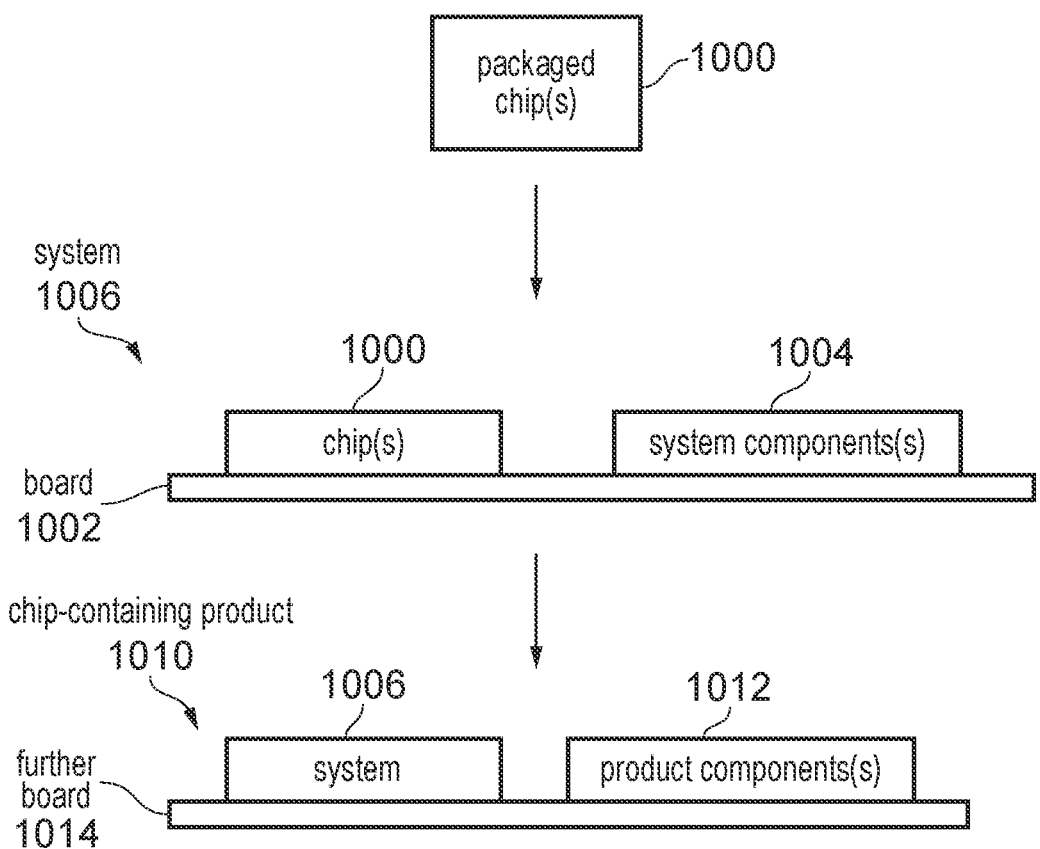
FIG. 10 illustrates a system and a chip-containing product according to some example embodiments.

As shown in FIG. 10, one or more packaged chips 1000, with the apparatus described above implemented on one chip or distributed over two or more of the chips, are manufactured by a semiconductor chip manufacturer. In some examples, the chip product 1000 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 1000 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 1000 are assembled on a board 1002 together with at least one system component 1004. For example, the board may comprise a printed circuit board. The board substrate may be made of any of a variety of materials, e.g. plastic, glass, ceramic, or a flexible substrate material such as paper, plastic or textile material. The at least one system component 1004 comprises one or more external components which are not part of the one or more packaged chip(s) 1000. For example, the at least one system component 1004 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 1010 is manufactured comprising the system 1006 (including the board 1002, the one or more chips 1000 and the at least one system component 1004) and one or more product components 1012. The product components 1012 comprise one or more further components which are not part of the system 1006. As a non-exhaustive list of examples, the one or more product components 1012 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 1006 and one or more product components 1012 may be assembled on to a further board 1014.

The board 1002 or the further board 1014 may be provided on or within a device housing or other structural support (e.g. a frame or blade) to provide a product which can be handled by a user and/or is intended for operational use by a person or company.

The system 1006 or the chip-containing product 1010 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Some examples of the present invention are set out in the following clauses:

(1) An apparatus comprising:
state tracking circuitry configured to maintain an access state of a page table entry specifying an address translation, wherein
the state tracking circuitry is configured to update the access state of the page table entry from a non-accessed state to a first-accessed state in response to an access to the page table entry; and
control circuitry configured to control caching of the address translation in an address translation cache, wherein
in response to the access state of the page table entry being the non-accessed state or the first-accessed state, the control circuitry is configured to suppress caching of the address translation in the address translation cache.

(2) The apparatus of clause (1), wherein
the state tracking circuitry is configured to update the access state into a multi-accessed state in response to a subsequent access to the page table entry; and
in response to the access state of the page table entry being the multi-accessed state, the control circuitry is configured to allow caching of the address translation in the address translation cache.

(3) The apparatus of clause (1) or clause (2), wherein
the state tracking circuitry is configured to maintain a usage state of the page table entry, the usage state indicating whether a memory access using the address translation is currently in progress.

(4) The apparatus of clause (3), wherein
the state tracking circuitry is configured to update the usage state to indicate that the memory access is in progress in response to an initiation of the memory access; and
the state tracking circuitry is configured to update the usage state to indicate that the memory access is no longer in progress in response to completion of the memory access using the address translation.

(5) The apparatus of clause (3) or clause (4), wherein
the state tracking circuitry is configured to update the access state of the page table entry into a multi-accessed state in response to the access to the page table entry while the usage state indicates that the memory access is in progress.

(6) The apparatus of any of clauses (3) to (5), wherein
the state tracking circuitry is configured to maintain a plurality of bits to represent the access state and the usage state.

(7) The apparatus of clause (6), wherein
the state tracking circuitry is configured to maintain the plurality of bits such that a least significant bit of the plurality of bits represents the usage state.

(8) The apparatus of clause (7), wherein
the state tracking circuitry is configured to increment the value represented by the plurality of bits in response to the access to the page table entry.

(9) The apparatus of clause (7) or clause (8), wherein
the state tracking circuitry is configured to increment the value represented by the plurality of bits in response to completion of the memory access using the address translation.

(10) The apparatus of clause (8) or clause (9), wherein
the state tracking circuitry is configured to increment the value represented by the plurality of bits atomically.

(11) The apparatus of any of clauses (6) to (10), wherein
the state tracking circuitry is configured to update the access state to a multi-accessed state by saturating the plurality of bits.

(12) The apparatus of any preceding clause, wherein
the state tracking circuitry is configured to maintain the access state to indicate a number of accesses to the page table entry.

(13) The apparatus of clause (12), wherein
the control circuitry is configured to suppress caching of the address translation in the address translation cache in response to the number of accesses being less than a predetermined threshold.

(14) The apparatus of any preceding clause, comprising:
invalidation circuitry configured to cause the address translation in the address translation cache to be invalidated in response to a software-generated invalidation signal, wherein
the software-generated invalidation signal is suppressed in response to a determination that the address translation entry has not been cached in the address translation cache.

(15) The apparatus of clause (14), wherein
the determination that the address translation entry has not been cached in the address translation cache is in response to the access state of the page table entry being the non-accessed state or the first-accessed state.

(16) The apparatus of any preceding clause, wherein
the state tracking circuitry is configured to store the access state in association with the page table entry in memory.

(17) The apparatus of any preceding clause, wherein
the state tracking circuitry is configured to store the access state in a field of the page table entry.

(18) A system comprising:
the apparatus of any preceding clause, implemented in at least one packaged chip;
at least one system component; and
a board,
wherein the at least one packaged chip and the at least one system component are assembled on the board.

(19) A chip-containing product comprising the system of clause (18) assembled on a further board with at least one other product component.

(20) A method comprising:
maintaining an access state of a page table entry specifying an address translation;
updating the access state of the page table entry from a non-accessed state to a first-accessed state in response to an access to the page table entry; and controlling caching of the address translation in an address translation cache, wherein in response to the access state of the page table entry being the non-accessed state or the first-accessed state, suppressing caching of the address translation in the address translation cache.

(21) A non-transitory computer-readable medium to store computer-readable code for fabrication of an apparatus comprising:

state tracking circuitry configured to maintain an access state of a page table entry specifying an address translation, wherein the state tracking circuitry is configured to update the access state of the page table entry from a non-accessed state to a first-accessed state in response to an access to the page table entry; and control circuitry configured to control caching of the address translation in an address translation cache, wherein in response to the access state of the page table entry being the non-accessed state or the first-accessed state, the control circuitry is configured to suppress caching of the address translation in the address translation cache.

In brief overall summary the present techniques allow for more effective tracking of whether an address translation specified by a page table entry is worth caching in an address translation cache. By tracking when and how many times the page table entry is accessed, the capacity available in the address translation cache can be used for address translations that are used more frequently instead of address translations that are used less frequently. The same tracking may be used for assessing whether a particular address translation has not been cached in order to avoid unnecessary invalidation procedures.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. An apparatus comprising:
state tracking circuitry configured to maintain an access state of a page table entry specifying an address translation, wherein
the state tracking circuitry is configured to update the access state of the page table entry from a non-accessed state to a first-accessed state in response to an access to the page table entry; and
control circuitry configured to control caching of the address translation in an address translation cache, wherein
in response to the access state of the page table entry being the non-accessed state or the first-accessed state, the control circuitry is configured to suppress caching of the address translation in the address translation cache.

2. The apparatus of claim 1, wherein
the state tracking circuitry is configured to update the access state into a multi-accessed state in response to a subsequent access to the page table entry; and
in response to the access state of the page table entry being the multi-accessed state, the control circuitry is configured to allow caching of the address translation in the address translation cache.

3. The apparatus of claim 2, wherein
the state tracking circuitry is configured to maintain a usage state of the page table entry, the usage state indicating whether a memory access using the address translation is currently in progress.

4. The apparatus of claim 3, wherein
the state tracking circuitry is configured to update the usage state to indicate that the memory access is in progress in response to an initiation of the memory access; and
the state tracking circuitry is configured to update the usage state to indicate that the memory access is no longer in progress in response to completion of the memory access using the address translation.

5. The apparatus of claim 3, wherein
the state tracking circuitry is configured to update the access state of the page table entry into a multi-accessed state in response to the access to the page table entry while the usage state indicates that the memory access is in progress.

6. The apparatus of claim 3, wherein
the state tracking circuitry is configured to maintain a plurality of bits to represent the access state and the usage state.

7. The apparatus of claim 6, wherein
the state tracking circuitry is configured to maintain the plurality of bits such that a least significant bit of the plurality of bits represents the usage state.

8. The apparatus of claim 7, wherein
the state tracking circuitry is configured to increment the value represented by the plurality of bits in response to the access to the page table entry.

9. The apparatus of claim 8, wherein
the state tracking circuitry is configured to increment the value represented by the plurality of bits atomically.

10. The apparatus of claim 7, wherein
the state tracking circuitry is configured to increment the value represented by the plurality of bits in response to completion of the memory access using the address translation.

11. The apparatus of claim 6, wherein
the state tracking circuitry is configured to update the access state to a multi-accessed state by saturating the plurality of bits.

12. The apparatus of claim 1, wherein
the state tracking circuitry is configured to maintain the access state to indicate a number of accesses to the page table entry.

13. The apparatus of claim 12, wherein the control circuitry is configured to suppress caching of the address translation in the address translation cache in response to the number of accesses being less than a predetermined threshold.

14. The apparatus of claim 1, comprising:

invalidation circuitry configured to cause the address translation in the address translation cache to be invalidated in response to a software-generated invalidation signal, wherein the software-generated invalidation signal is suppressed in response to a determination that the address translation entry has not been cached in the address translation cache.

15. The apparatus of claim 14, wherein the determination that the address translation entry has not been cached in the address translation cache is in response to the access state of the page table entry being the non-accessed state or the first-accessed state.

16. The apparatus of claim 1, wherein the state tracking circuitry is configured to store the access state in association with the page table entry in memory.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17 assembled on a further board with at least one other product component.

19. A method comprising:

maintaining an access state of a page table entry specifying an address translation;

updating the access state of the page table entry from a non-accessed state to a first-accessed state in response to an access to the page table entry; and controlling caching of the address translation in an address translation cache, wherein in response to the access state of the page table entry being the non-accessed state or the first-accessed state, suppressing caching of the address translation in the address translation cache.

20. A non-transitory computer-readable medium to store computer-readable code for fabrication of an apparatus comprising:

state tracking circuitry configured to maintain an access state of a page table entry specifying an address translation, wherein the state tracking circuitry is configured to update the access state of the page table entry from a non-accessed state to a first-accessed state in response to an access to the page table entry; and control circuitry configured to control caching of the address translation in an address translation cache, wherein in response to the access state of the page table entry being the non-accessed state or the first-accessed state, the control circuitry is configured to suppress caching of the address translation in the address translation cache.

\* \* \* \* \*